United States Patent

[11] 3,532,119

| [72] | Inventor | Nils S. Lind<br>Montgomery, Alabama |
| --- | --- | --- |
| [21] | Appl. No. | 717,702 |
| [22] | Filed | April 1, 1968 |
| [45] | Patented | Oct. 6, 1970 |
| [73] | Assignee | Kershaw Manufacturing Company,<br>Incorporated<br>a corporation of Alabama |

[54] PRESSURE COMPENSATED CONTROL VALVE
7 Claims, 4 Drawing Figs.

| [52] | U.S. Cl. | 137/596 |
| --- | --- | --- |
| [51] | Int. Cl. | F16k 11/07 |
| [50] | Field of Search | 137/3, 7,<br>88, 595, 596, 596.12, 596.13, 596.2 |

[56] References Cited
UNITED STATES PATENTS

| 2,608,824 | 9/1952 | Kirkham | 137/596.12X |
| --- | --- | --- | --- |
| 2,873,762 | 2/1959 | Tennis | 137/596.13 |

*Primary Examiner*—Henry T. Klinksiek
*Attorney*—Jennings, Carter and Thompson

ABSTRACT: A valve for controlling the direction and rate of flow of fluid under pressure, including a self-adjusting pressure compensating non-bypass flow regulator which maintains a constant pressure differential across a variable metering opening of valve regardless of change in pressure between the input side and output side of the valve where there are differentials in input and output pressure.

Patented Oct. 6, 1970
3,532,119
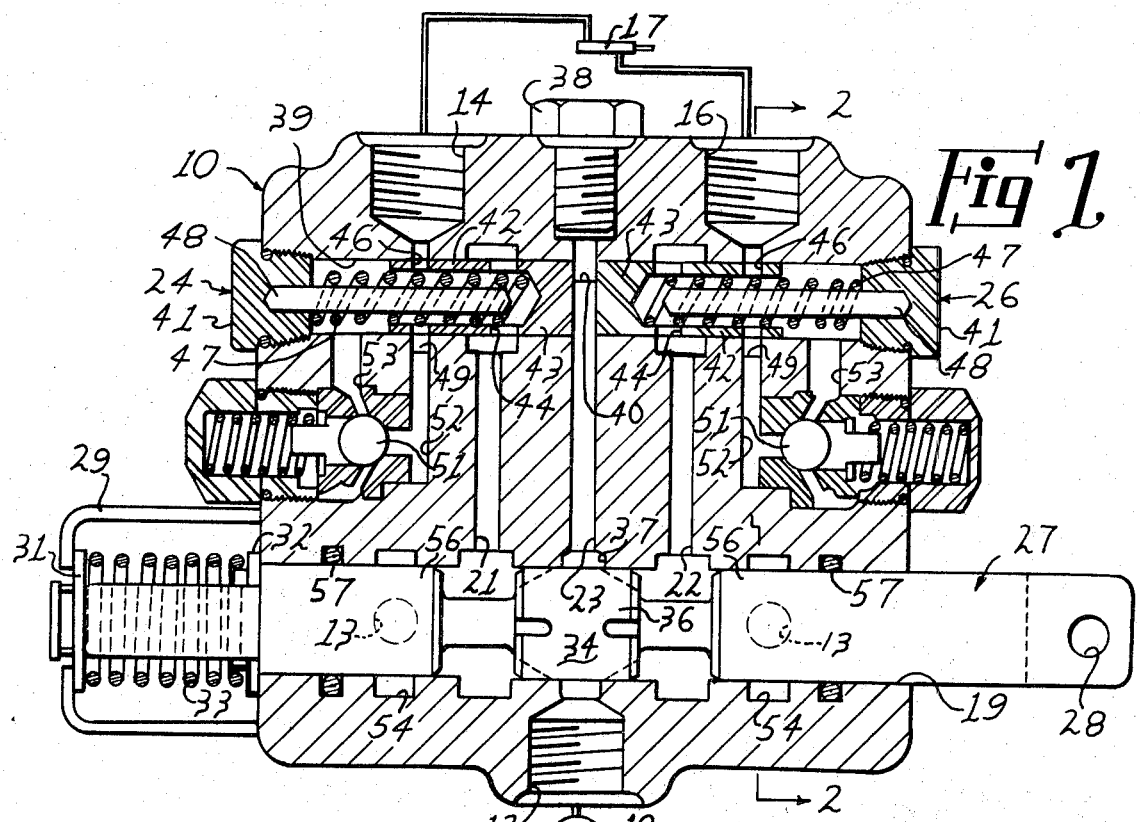
Fig 1
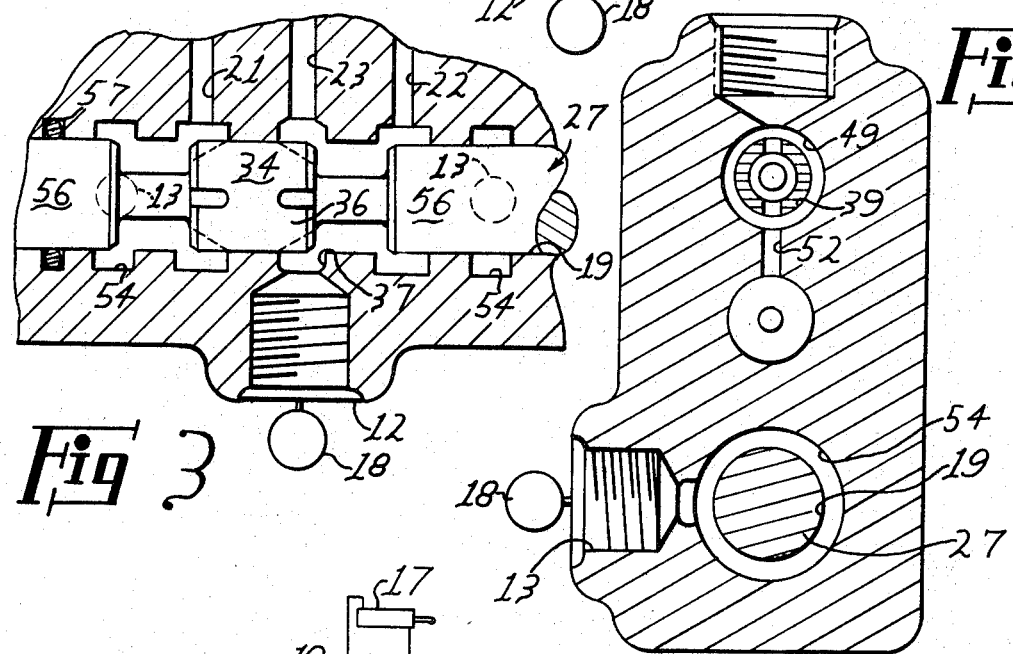
Fig 2
Fig 3
Fig 4
INVENTOR.
Nils S. Lind
BY
Jennings, Carter & Thompson
ATTORNEYS 3,532,119

PRESSURE COMPENSATED CONTROL VALVE

BACKGROUND OF THE INVENTION

This invention relates to a pressure compensated control valve of the type which is particularly adapted for use with a closed center fluid pressure operated system. More specifically, my improved valve combines the principles of a conventional four-way valve with a pressure compensated non-bypass flow regulator whereby accurate metering is maintained by producing constant pressure differential across the metering lands of the four-way valve spool regardless of the inlet or output pressure. Heretofore in the art to which my invention relates, the use of closed center fluid pressure operated systems has been limited due to the absence of a satisfactory metering type control valve.

BRIEF SUMMARY OF INVENTION

My improved valve comprises a valve body having an inlet port, exhaust ports and additional ports for selectively delivering fluid from the valve and returning fluid thereto. Fluid supply passageways communicate the inlet port selectively with one of the additional ports at a time so that fluid is returned to the valve through the other of said additional ports. Also, said other additional port communicates with an exhaust port while fluid is delivered to said one of the additional ports. Metering elements are associated with the supply passageways and are movable to selected positions to control the flow of fluid therethrough. An intermediate passageway communicates with the inlet port to supply fluid under pressure adjacent the inner ends of the metering elements whereby the metering elements are urged outwardly toward a position to restrain flow of fluid through either of the supply passageways until the pressure within the intermediate passageway is overcome by the force exerted by the fluid under pressure in the fluid supply passageway and the force exerted by the springlike member which urges the metering elements toward each other to a position to release the flow of fluid.

Apparatus embodying features of my invention is illustrated in the accompanying drawing, forming a part of this application, in which:

FIG. 1 is a vertical sectional view through the valve showing the valve in neutral position and prior to the introduction of fluid under pressure thereto;

FIG. 2 is a sectional view taken generally along the line 2–2 of FIG. 1;

FIG. 3 is a fragmental, sectional view corresponding to FIG. 1 showing the valve actuating mechanism moved toward the left whereby fluid under pressure is supplied to the supply passageway at the right side of the intermediate passageway, as viewed in FIG. 3; and FIG. 4 is a diagrammatic view showing the control valve connected to a reservoir and to a work unit, such as a fluid pressure operated cylinder.

Referring now to the drawing for a better understanding of my invention, I show a valve body 10 having an inlet port 12, exhaust ports 13 and additional ports 14 and 16 for selectively delivering fluid from the valve to a work unit, such as a fluid pressure operated cylinder 17, and then returning the fluid to the valve. The inlet port 12 communicates with a suitable source of fluid under pressure, such as a pressure compensated pump which communicates with a reservoir 18. Exhaust ports 13 are also connected to the reservoir 18.

The valve body 10 is provided with a bore 19 which extends therethrough, as shown in FIG. 1. The inlet port 12 and the exhaust ports 13 communicate with the bore 19, as shown. Also communicating with the bore 19 are supply passageways 21 and 22 and an intermediate passageway 23. The passageways 21 and 22 are adapted to supply fluid under pressure selectively to the ports 14 and 16 through metering elements indicated generally at 24 and 26 to be described hereinafter.

Mounted for axial movement in the bore 19 is an elongated actuating member 27 having an opening 28 at one end thereof for operatively connecting an actuating element, such as a handle or the like. The other end of the elongated actuating member 27 projects outwardly of the housing 10 and is encased by a housing 29 which carries a spring abutment 31. Mounted between the spring abutment 31 and a collar 32 surrounding the member 27 is a compression spring 33 which is adapted to urge the actuating member 27 toward the neutral position, as shown in FIG. 1.

The central portion of the elongated actuating member 27 is in the form of a spool 34 which is adapted to move from the neutral position shown in FIG. 1 to a first position toward the left, as viewed in FIG. 3 and to a second position at the right of the neutral position. The spool 34 is provided with a land 36 directly opposite the intermediate passageway 23 which is disposed to restrain flow of fluid under pressure to either of the supply passageways 21 or 22 while the spool 34 is in the neutral position shown in FIG. 1. An enlarged recess 37 surrounds the spool 34 between the inlet port 12 and the intermediate passageway 23 whereby the inlet port 12 is always in communication with the intermediate port 23. The end of the intermediate passageway 23 opposite the recess 37 is closed by a suitable plug member 38. The land 36 on the spool 34 is of a size and length to communicate the inlet port 12 with the supply passageway 22 when the spool 34 is moved to the left position, as shown in FIG. 3. On the other hand, when the spool 34 is moved by the actuating member 27 to a corresponding position at the right of the neutral position shown in FIG. 1, the inlet port 12 communicates with the supply passageway 21.

As shown in FIGS. 1 and 2, a bore 39 extends through the upper portion of the valve body 10 for receiving the metering elements 24 and 26. The outer ends of the bore 39 are closed by plug members 41, as shown in FIG. 1. Mounted for sliding movement within the bore 39 inwardly of the plug members 41 are metering sleeve members 42 which are positioned at opposite sides of the intermediate passageway 23 and are closed at their inner ends as at 43. Accordingly, fluid under pressure within the intermediate passageway 23 urges the sleeve members 42 outwardly away from each other and away from the intermediate passageway 23. The plug 38 carries an elongated projection 40 which serves as a stop for the members 42.

As shown in FIG. 1, openings 44 are provided adjacent the inner ends of the sleeve members 42 to communicate the passageways 21 and 22 with the interior of the sleeve members 42 in all positions of the sleeve member. Also, openings 46 are provided in the sleeve members 42 which are adapted to register or move into alignment with the ports 14 and 16 when the sleeve members 42 are moved inwardly to the position shown in FIG. 1.

To overbalance the pressure exerted within the intermediate passageway 23, upon the introduction of fluid under pressure through either supply passageway 21 or 22, compression springs 47 are interposed between the sleeve members 42 and the plug members 41 whereby the sleeve members 42 are urged inwardly toward each other and toward the intermediate passageway 23. Upon introduction of fluid under pressure through either supply passageway 21 or 22, by moving actuating member 27, the pressure within the intermediate passageway 23 is counterbalanced by this fluid under pressure introduced through passageway 21 or 22 at one side of intermediate passageway 23, whereby the spring 47 at that side of intermediate passageway 23 moves its associated sleeve member 42 inwardly toward the intermediate passageway 23 to align its opening 46 with port 14 or 16, as the case may be. Preferably, a rod 48 is connected to each of the plug members 41 and extends inwardly adjacent the axial center of the sleeve member 42 thus forming a guide for the springs 47 as the pistons on the sleeve members 42 connected thereto move axially within the bore 39. Upon introducing fluid under pressure through the inlet port 12 while the spool 34 is in the neutral position, there would be a buildup of pressure within the intermediate passageway 23 which would cause the sleeves 42 to move outwardly away from each other, and away from the position shown in FIG. 1, to thus move the openings 46 out of alignment with the ports 14 and 16 whereby there would be no flow through either of the ports 14 and 16.

An annular passageway 49 is provided in the valve body 10 in position to surround each of the sleeve members 42, directly opposite the ports 14 and 16 whereby fluid returned from the hydraulic cylinder 17 is adapted to move around the sleeve member 42. Each annular passageway 49 communicates with a check valve unit 51 by a conduit 52. Fluid passing through each check valve 51 is returned to the interior of its sleeve member 42 by a conduit 53. Accordingly, fluid returning to either one of the ports 14 or 16 flows around the sleeve 42, due to the fact that the opening 46 is moved out of alignment with the port 14 or 16 at that time, whereupon the fluid then flows through the check valve 51 and then returns by passageway 53 to the interior of the sleeve member 42. The fluid thus returned is then discharged through the opening 44 in the sleeve member 42 into the conduit 21 or 22, as the case may be, whereupon the fluid is returned to the bore 19. An enlarged, annular recess 54 is provided in the bore 19 directly opposite each exhaust port 13 whereby fluid returned to the bore 19 through either passageway 21 or 22 is discharged through the annular recess 54 and the exhaust port 13 associated therewith whereby there is no build up of pressure in sleeve 42 at the exhaust side of valve body 10.

As shown in FIGS. 1 and 3, the elongated actuating member 27 is provided with lands 56 which are adapted to slidably engage the bore 19 adjacent opposite sides of the recesses 54 whereby there is no flow of fluid through the exhaust port 13 which is located at the side of the inlet port 12 from which fluid under pressure is introduced into the passageway 21 or 22, as the case may be. That is, with the spool 34 moved to the left, as viewed in FIG. 3, fluid under pressure is introduced through inlet port 12 to the passageway 22 while the fluid returned to the valve passes downwardly through passageway 21 and is exhausted through the annular recess 54 into the exhaust port 13 located at the left of inlet port 12. With the spool 34 in the position shown in FIG. 3 there would be no flow of fluid from the passageway 22 or the inlet port 12 through the exhaust port 13 at the right side of inlet port 12 due to the seal between the member 27 and the inner surface of the bore 19. Suitable seals 57 are provided between the bore 19 and the actuating member 27.

From the foregoing description, the operation of my improved valve will be readily understood. Upon introducing fluid under pressure, with the spool 34 in the neutral position shown in FIG. 1, fluid under pressure passes around the spool through recess 37 and enters the intermediate passageway 23 whereby force is exerted against the inner ends of the sleeve members 42 thus forcing the sleeve members outwardly away from each other. The sleeve members 42 thus move outwardly whereby the openings 46 move out of alignment with the ports 14 and 16 whereby there is no flow through either of the ports 14 and 16. In the event any fluid is trapped within sleeve members 42 while the spool 34 is in neutral position, there would be no flow of fluid through sleeve members 42 since spool 34 and lands 56 prevent the flow of fluid into passageways 21 or 22 or from ports 13. That is, such trapped fluid could only pass out ports 14 or 16 which would reduce pressure within the adjacent sleeve member 42 whereupon its opening 46 would then move out of alignment with port 14 or 16, as the case may be.

Upon shifting the actuating member 27 toward the left, as viewed in FIG. 3, the spool 34 moves toward the left thus permitting fluid under pressure to pass from the inlet port 12 through bore 19 to the supply passageway 22. As the fluid under pressure passes into passageway 22 the pressure will increase inside the metering element 26 located at the right side of the intermediate passageway 23. As soon as the force of the metering elements 26, caused by the pressure of the fluid within sleeve member 42 plus the spring force exerted by spring member 47 overcomes the force exerted on the inner side of sleeve member 42, the sleeve member 42 will start to shift toward the center of the valve body 10 until the opening 46 moves into alignment with the port 16 whereupon fluid under pressure then flows through port 16 to the work unit 17 and is then returned to port 14 whereupon the fluid passes around sleeve 42 through annular passageway 49 to the check valve 51. Fluid must pass around sleeve 42 since spool 34 is in the position shown in FIG. 3 whereby there is no flow of fluid from inlet port 12 to passageway 21. Accordingly, fluid under pressure in intermediate passageway 23 moves sleeve member 42 at the left side of FIG. 1 outwardly to thus move opening 46 out of alignment with port 14. The returned fluid then passes through passageway 53 to the interior of bore 39 whereupon fluid then flows inwardly through the sleeve member 42 and is discharged through opening 44 into the passageway 21 since opening 44 remains in communication with passageway 21. From passageway 21, the returning fluid flows through annular passageway 54, as shown in FIG. 3, whereupon it is discharged through exhaust port 13 located at the left side of inlet port 12, as viewed in FIG. 3. Upon shifting the actuating members 27 toward the right, the spool 34 moves to a position where fluid passes from inlet port 12 through supply passageway 21 whereby the fluid passes upwardly through opening 44 in the metering element 24 through port 14 to the work unit 17. The fluid is then returned through port 16 around passageway 49, since port 16 is then out of alignment with its opening 46, to passageway 52 whereupon the fluid flows through the check valve 51 and is then returned by passageway 53 to the interior of the sleeve 42 at the right side of the intermediate passageway 23. The fluid then passes downwardly through passageway 22 whereupon it flows through annular passageway 54 located at the right of inlet port 12 and then passes outwardly through exhaust port 13 located at the right of inlet port 12. Upon shifting the actuating member 27 toward the left or right, as viewed in FIGS. 1 and 3, the land 56 at the left or right, respectively, moves to a position to communicate the exhaust port 13 adjacent thereto with the passageway 44 adjacent thereto whereby there would be no build up of pressure within the adjacent sleeve member 42 at the exhaust side of the valve body.

In the event the pressure at a discharge port 14 or 16, as the case may be, decreases, the metering element associated therewith will shift toward the outside of the valve body 10 away from intermediate port 23 and thus throttle the flow through the discharge port 14 or 16 to the work cylinder 17, thereby maintaining a constant pressure differential between inlet port 12 and passageways 21 or 22, as the case may be, which is dependent upon the direction the actuating member 27 is shifted.

From the foregoing, I have devised an improved valve for controlling the direction and rate of flow of fluid under pressure. By providing a self-adjusting pressure compensated non-bypass flow regulator, my improved valve maintains a constant pressure differential between the inlet port 12 and passageway 21 or 22 regardless of the differences in input and output pressure. Accordingly, my improved valve is particularly adapted for use with equipment wherein there are changes in the pressure at the discharge side of the valve. For example, where my improved valve is employed for raising and lowering a boom of a crane or the like, there would be a substantial build up of pressure at the discharge outlet of the valve while the boom is elevated. On the other hand, as the boom is lowered, there would be a sudden drop in pressure whereby the metering element would shift outwardly away from the intermediate passageway 23 to thus restrain the flow of fluid and thus, in connection with a conventional type double check valve or counterbalance valve, control the rate of movement of the apparatus. Accordingly, the apparatus would operate at a constant speed regardless of whether the load was increased or decreased. My improved design also allows the valve to be used as a single spool or as a section in a stack valve.

I claim:

1. In a valve having a body with an inlet port, exhaust ports and a pair of additional ports for selectively delivering fluid from said valve and returning fluid to said valve:
   a. there being fluid supply passageways communicating said inlet port selectively with one of said additional ports at a time so that fluid is returned to said valve through the other of said additional ports;
   b. means communicating said other of said additional ports with an exhaust port while fluid is delivered to said one of said additional ports;
   c. A first metering element communicating with one of said supply passageways and movable to selected positions to control the flow of fluid therethrough;
   d. a second metering element communicating with the other of said supply passageways and movable to selected positions to control the flow of fluid therethrough;
   e. means urging said first and second metering elements toward a position to release the flow of fluid through either of said supply passageways; and
   f. there being an intermediate passageway in communication with said inlet port supplying fluid under pressure adjacent one end of each of said metering elements and urging said metering elements toward a position to restrain flow of fluid through either of said supply passageways until the pressure within said intermediate passageway is overcome by the combined force exerted by fluid under pressure in one of said supply passageways and the force exerted by said means urging said metering elements toward a position to release to flow of fluid.

2. A valve as defined in claim 1 in which the fluid supply passageways communicate with the inlet port by means comprising:
   a. there being a bore in said valve body in communication with said inlet port, said fluid supply passageways and said intermediate passageway;
   b. a spool disposed for axial movement in said bore selectively from a neutral position to a first position and a second position, respectively, at opposite sides of neutral position;
   c. a land on said spool adjacent said intermediate passageway disposed to restrain flow of fluid under pressure to either of said supply passageways while said spool is in neutral position;
   d. means communicating said inlet port with said intermediate passageway while said spool is in said first, second and neutral positions;
   e. said land on said spool being of a size and length to communicate said inlet port with one of said fluid supply passageways upon movement of said spool to said first position and to communicate said inlet port with the other of said fluid supply passageways upon movement of said spool to said second position; and
   f. means to move said spool to said first, second and neutral positions.

3. A valve as defined in claim 2 in which exhaust ports also communicate with said bore in the valve body at locations outwardly of said supply passageways, and the means to move said spool comprises an elongated member operatively connected to opposite ends of said spools, there being other lands on said elongated member spaced axially and outwardly from opposite ends of said spool with recesses between said spool and said other lands in position to communicate said other of said fluid supply passageways with an exhaust port upon movement of said spool to said first position, and to communicate said one of said fluid supply passageways with an exhaust port upon movement of said spool to said second position.

4. A valve as defined in claim 3 in which said means communicating said other of said additional ports with an exhaust port comprises:
   a. a first exhaust passageway communicating said other of said additional ports with said other of said supply passageways upon movement of said spool to said first position and a second exhaust passageway communicating said one of said additional ports with said one of said supply passageways upon movement of said spool to said second position; and
   b. check valves in said exhaust passageways limiting fluid flow to a direction from said additional ports to said supply passageways.

5. A valve as defined in claim 1 in which said metering elements comprise:
   a. a pair of metering sleeves having closed ends adjacent said intermediate passageway;
   b. there being a bore in said valve body slidably receiving said metering sleeves with said bore communicating with said fluid supply passageways and said intermediate passageway and with said metering sleeves being at opposite sides of said intermediate passageway so that fluid under pressure in said intermediate passageway urges said metering sleeves outwardly toward a position to restrain flow of fluid through said supply passageways;
   c. means urging said metering sleeves inwardly toward said intermediate passageway; and
   d. there being a metering passageway in each metering sleeve in communication with its associated supply passageway increasing the flow of fluid therethrough upon movement of said metering sleeve inwardly toward said intermediate passageway and restraining the flow of fluid therethrough upon outward movement of said metering sleeve to maintain a constant pressure differential between said inlet port and said fluid supply passageway communicating therewith.

6. A valve as defined in claim 5 in which the means urging said metering sleeves inwardly comprises:
   a. spring abutments mounted in the bore which slidably receives the metering sleeves; and
   b. spring members interposed between said metering sleeves and said spring abutments.

7. A valve as defined in claim 5 in which each metering sleeve comprises:
   a. a sleeve member adapted for sliding movement in said bore;
   b. a piston-like member adjacent the inner end of said sleeve member; and
   c. there being a metering passageway through said sleeve member disposed to permit flow therethrough and the supply passageway associated therewith upon inward movement of said sleeve member to a position to align said metering passageway with said supply passageway and disposed to restrain flow therethrough and the supply passageway associated therewith upon outward movement of said sleeve member to a position to move said metering passageway out of alignment with said supply passageway.